United States Patent
Robinson

(10) Patent No.: US 8,179,417 B2
(45) Date of Patent: May 15, 2012

(54) VIDEO COLLABORATION

(75) Inventor: Ian N. Robinson, Pebble Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 12/507,638

(22) Filed: Jul. 22, 2009

(65) Prior Publication Data

US 2011/0018963 A1    Jan. 27, 2011

(51) Int. Cl.
H04M 11/00     (2006.01)

(52) U.S. Cl. ..................... 348/14.01; 382/103

(58) Field of Classification Search .... 348/14.01–14.08, 348/14.09, 14.16; 382/103, 190, 117, 173, 382/293, 295, 298
See application file for complete search history.

(56) References Cited

U.S. PATENT DOCUMENTS

| | | | |
|---|---|---|---|
| 6,339,842 B1 * | 1/2002 | Fernandez et al. | 725/133 |
| 6,466,250 B1 * | 10/2002 | Hein et al. | 348/14.16 |
| 6,710,797 B1 | 3/2004 | McNelley et al. | |
| 6,717,607 B1 | 4/2004 | Lauper et al. | |
| 6,784,916 B2 | 8/2004 | Smith | |
| 7,230,639 B2 | 6/2007 | Ferren et al. | |
| 7,600,191 B2 * | 10/2009 | Yoshikawa et al. | 715/790 |
| 2003/0193559 A1 * | 10/2003 | Fernandez et al. | 348/14.08 |
| 2005/0007445 A1 | 1/2005 | Foote et al. | |
| 2006/0247045 A1 * | 11/2006 | Jeong et al. | 463/35 |
| 2007/0200925 A1 | 8/2007 | Kim | |
| 2008/0246834 A1 * | 10/2008 | Lunde et al. | 348/14.09 |
| 2008/0297589 A1 | 12/2008 | Kurtz et al. | |
| 2008/0316298 A1 * | 12/2008 | King et al. | 348/14.09 |
| 2009/0195638 A1 * | 8/2009 | Caspi et al. | 348/14.09 |
| 2010/0118202 A1 * | 5/2010 | Yoshida | 348/581 |
| 2010/0277563 A1 * | 11/2010 | Gupta et al. | 348/14.08 |
| 2011/0085028 A1 * | 4/2011 | Samadani et al. | 348/51 |
| 2011/0169910 A1 * | 7/2011 | Khot et al. | 348/14.09 |
| 2011/0187889 A1 * | 8/2011 | Hirata | 348/222.1 |

* cited by examiner

Primary Examiner — Curtis Kuntz
Assistant Examiner — Maria El-Zoobi
(74) Attorney, Agent, or Firm — Jack H. McKinney

(57) ABSTRACT

A video collaboration method includes examining a video image to locate therein a strip segment containing desired facial features of a second collaborator. The method also includes causing a display of the strip segment in a second frame positioned above a first frame for communicating shared collaboration content on a display device positioned for a first collaborator.

20 Claims, 11 Drawing Sheets

VIDEO COLLABORATION

BACKGROUND

Face to face meetings no longer require participants to be in the same room let alone the same country. Live, real-time video feeds streamed between remote sites allow meeting participants to personally interact without incurring travel expenses. Often, meeting participants collaborate on a virtual white board by sharing content such as spreadsheets, text files, or other documents. Unfortunately, this typically involves sharing a screen that—in smaller, single screen environments—utilizes the entire display preventing the participants from viewing video of one another. If allowed to communicate a natural gaze between one another and the shared content, remote participants could enjoy a more realistic collaboration experience.

DRAWINGS

DETAILED DESCRIPTION

Figure 1:
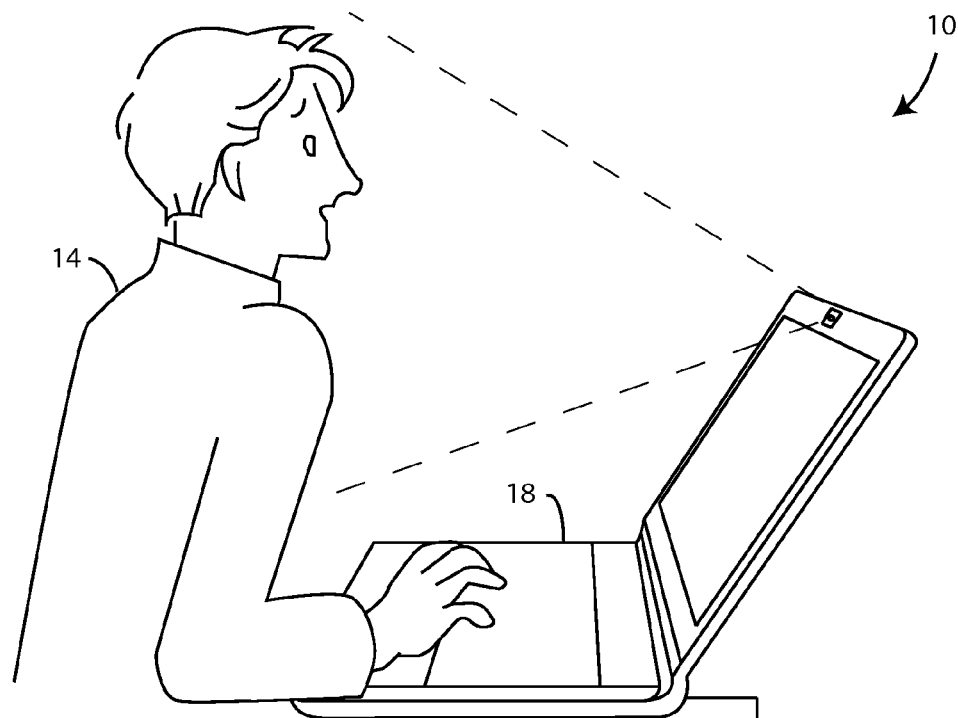
FIG. 1 is an exemplary depiction of a remote meeting environment in which various embodiments may be implemented.
Figure 1:
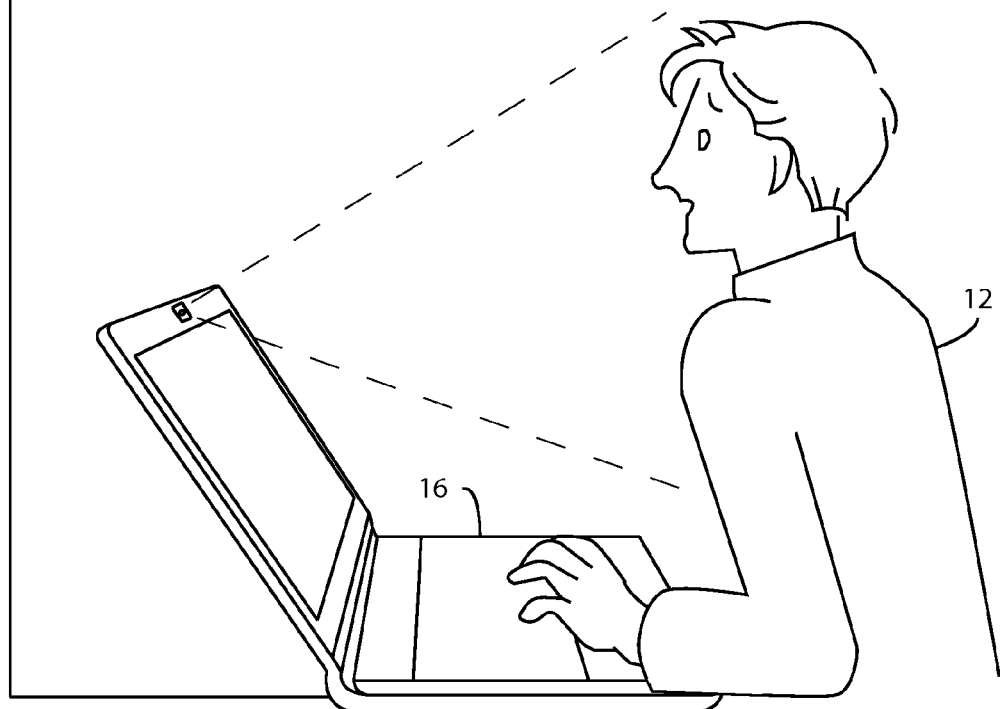

FIG. 1 depicts an exemplary environment 10 in which various embodiments discussed below may be implemented. In environment 10, local collaborator 12 and remote collaborator 14 are sharing content utilizing computers 16 and 18 via link 20. In addition to including a display device for viewing the shared content, computers 16 and 18 each include an integrated or connected video capture device. The video capture device for computer 16 is positioned for streaming video of local collaborator 12 for display by computer 18. The video capture device for computer 18 is positioned for streaming video of remote collaborator 14 for display by computer 16. The descriptors "local" and "remote" as used herein from the perspective of the local collaborator 12. With respect to remote collaborator 14, the descriptors would be switched. From a third party's perspective, both collaborators 12 and 14 may be remote.

Various embodiments described below enable meeting participants, with limited display space, to communicate a natural gaze between one another and any shared content. In doing so, a strip segment of a video image containing the gaze of remote collaborator 14 is positioned above a display of the shared content on computer 16. Likewise, a strip segment of a video image containing the gaze of local collaborator 12 is positioned above a display of the shared content on computer 18. Where, as in FIG. 1, computers 16 and 18 are laptop computers with a video capture devices integrated into the bezels at the top of their display screens, the displays of the strip segments are positioned directly below those video capture devices.

The following description is broken into sections. The first, labeled "Natural Gaze," describes an exemplary graphical user interface that communicates a natural gaze between collaborators and any shared content. That natural gaze is communicated via a strip segments taken from video images of the collaborators. The second section, labeled "Strip Segment," describes examples of scaling and orienting strip segments for display. The third section, labeled "Additional Collaborators," describes instances in which three or more participants are involved in a video collaboration session. The fourth section labeled "Components," describes physical and logical components of various embodiments. The last section, labeled "Operation," describes steps taken to implement various embodiments.

Figure 2:
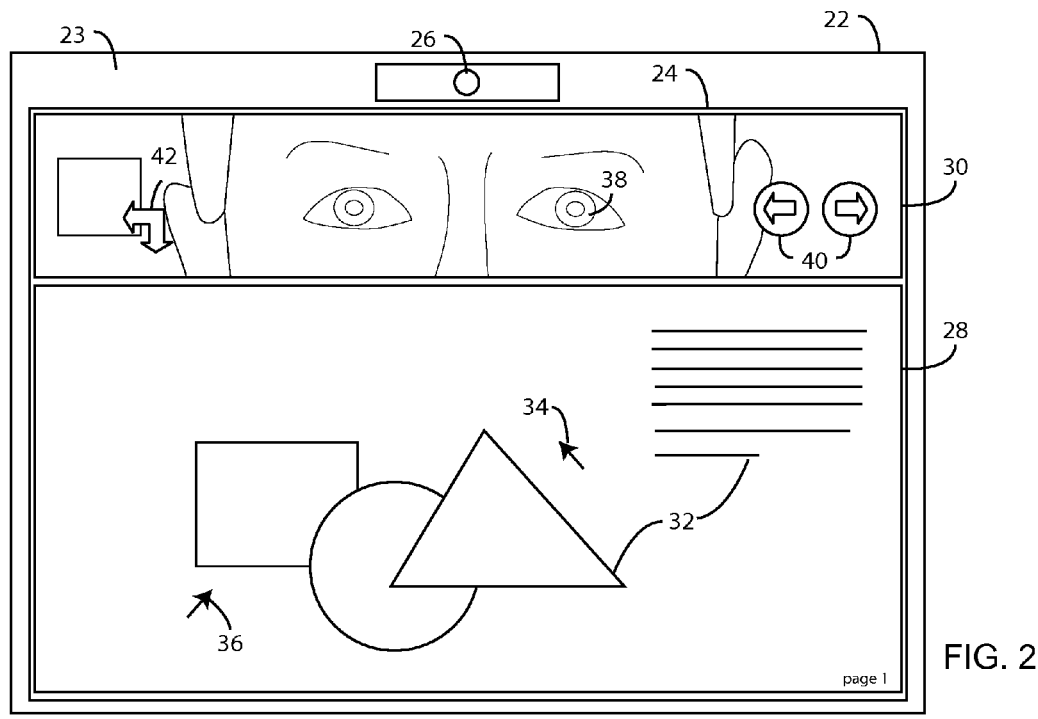
FIGS. 2-4 depict exemplary screen views according to various embodiments.
Figure 3:
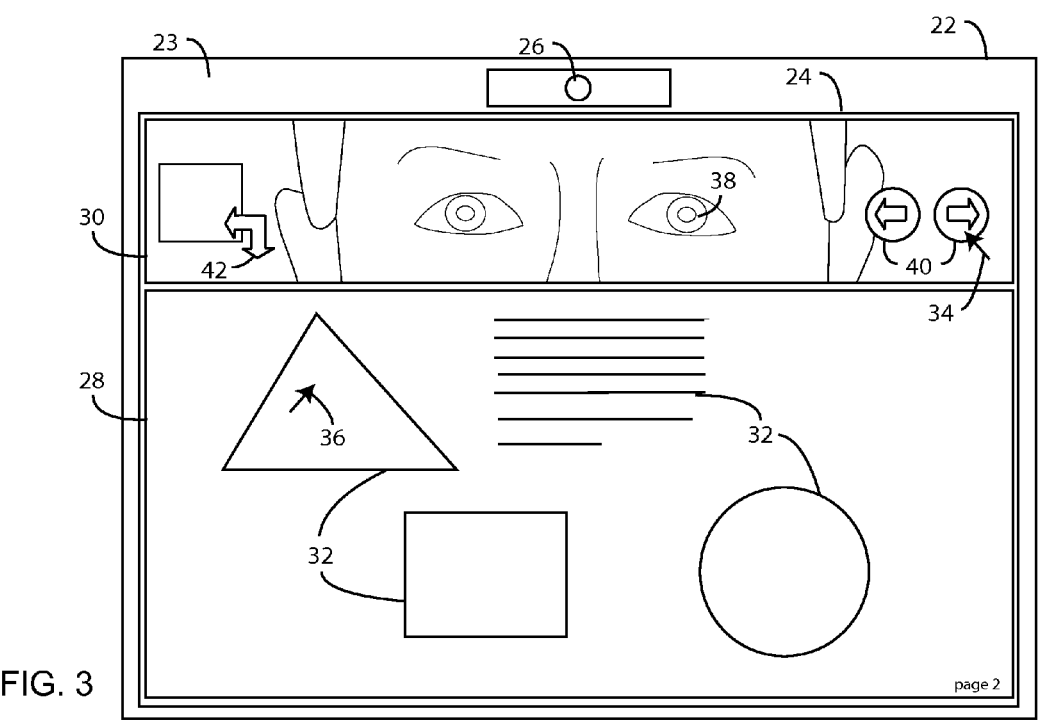
Figure 4:
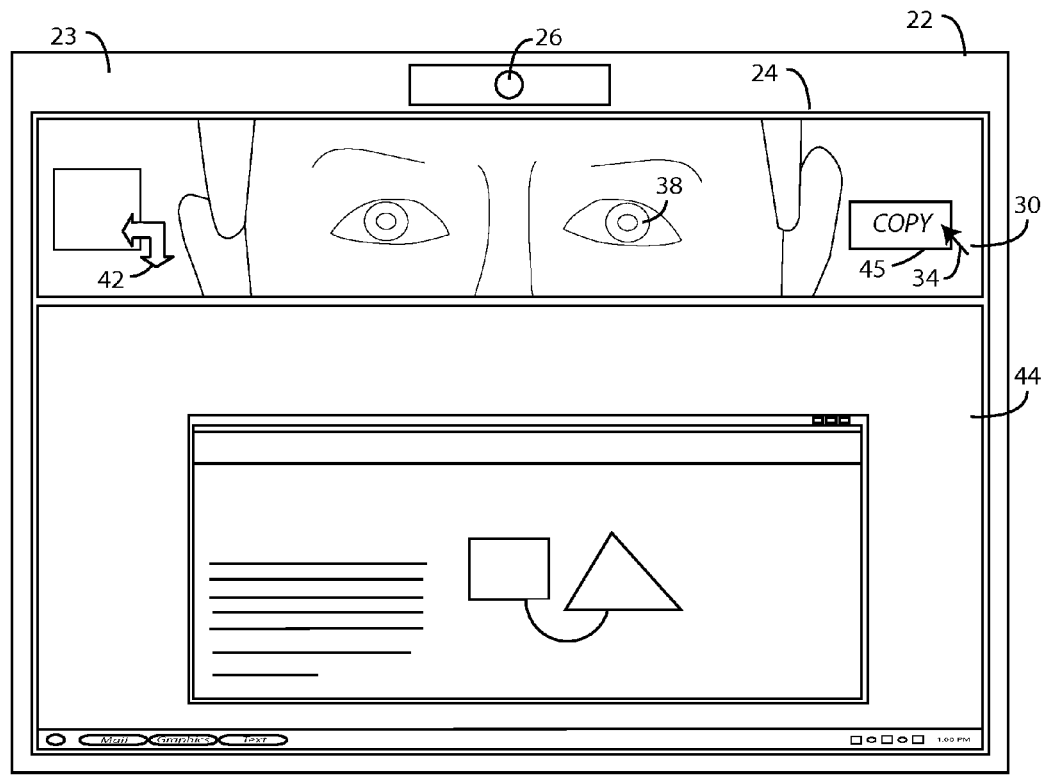

NATURAL GAZE: FIGS. 2-4 depict exemplary screen displays on a local display device 22. Local display device 22 represents generally any device capable of being caused to display desired images and motion video. In the Example of FIGS. 2-4, local display device 22 is the display of a laptop computer and is shown to include bezel 23, screen 24, and video capture device 26. Bezel 23 represents generally a rim or frame that surrounds screen 24. Screen 24, for example, may be an LCD, plasma, or LED display. Video capture device 26 represents generally any device capable of being utilized to capture and stream video images of a user—a local collaborator—positioned to view screen 24. In the examples of FIGS. 2-4, video capture device 26 is integrated into bezel 23. In other examples, video capture device 26 may be a separate component detachably clipped to bezel 23.

Referring first to FIG. 2, screen 24 is shown to display local frames 28 and 30. Frame 28 contains the shared content 32 of a video collaboration session. It is also shown to include cursor 34 of a local collaborator and cursor 36 of a remote collaborator. Frame 30, positioned above frame 28 and below video capture device 26, is shown to include the gaze 38 of the remote collaborator. As discussed below with respect to FIGS. 5-8, frame 30 displays a strip segment of a captured video image of the remote collaborator.

In the above example, it is presumed that remote collaborator is gazing at a complimentary remote display device that includes a first remote frame displaying the gaze of the local collaborator positioned above a second remote frame displaying the shared content. The first remote frame is positioned below a remote video capture device used to capture video images of the remote collaborator. Thus, when the remote collaborator looks at the first remote frame displaying the local collaborator's gaze, the image of the remote collaborator appears, on display device 22, to be gazing out of frame 30 at the local collaborator. When the remote collaborator looks at the second remote frame displaying the shared content, the image of remote collaborator on display device 22 appears to be gazing down at frame 28 containing the shared content.

Frame 30 also includes controls 40 and 42 which represent generally user selectable icons that, when selected, cause the initiation of a desired action. In a particular example, a history of past shared content displayed in frame 28 may be retained as a series of pages. Controls 40, when selected, flip the between those pages within frame 28 as depicted in FIG. 3, in a similar fashion to the "back" and "forward" buttons of a standard web browser. Control 42, when selected switches the display within frame 28 between the shared content as displayed in FIGS. 2 and 3 and the local collaborator's desktop 44 as depicted in FIG. 4. Control 45, depicted in FIG. 4, when selected, causes content from the desktop to be copied as shared content and displayed as depicted in FIGS. 2 and 3.

STRIP SEGMENT: As depicted in the examples of FIGS. 2-4, display device 22 has a relatively limited display area making it impractical if not impossible to separately display both the shared content and a life-sized face of the remote collaborator. From the perspective of the local collaborator, "life-sized" is used herein to refer to a life-sized appearance of a remote collaborator's gaze as though the remote collaborator were positioned at a "virtual" distance behind display device 22. For example, a normal conversation distance may be four feet. The virtual distance, then, may be set at two feet with the assumption that the local collaborator is positioned two feet in front of display device 22. Assuming the average distance between a person's eyes is three inches, the distance between the remote collaborator's eyes, as displayed, should be one and a half inches. Thus, to the local collaborator, the remote collaborator appears to be positioned behind display device 22 at the virtual distance.

To compensate for the limited display area, a strip segment containing the gaze (such as gaze 38) is taken from a video image of the remote collaborator. The initial dimensions of the strip segment are selected to be proportional to:
  the dimensions of the frame (such as frame 30) in which the gaze is to be displayed; and
  a dimension of the facial features (such as an intraocular distance) of the remote collaborator within the video image.
The strip segment is positioned with respect to the video image to encompass the remote collaborator's gaze. The contents of the strip segment are then scaled and oriented to fit the frame of the user interface such that the eyes of the remote collaborator, as displayed, are spaced apart by a given intraocular distance. That intraocular distance is selected so that, from the perspective of the local collaborator, the remote collaborator appears to be positioned behind display device at a preselected virtual distance.

Figure 5:
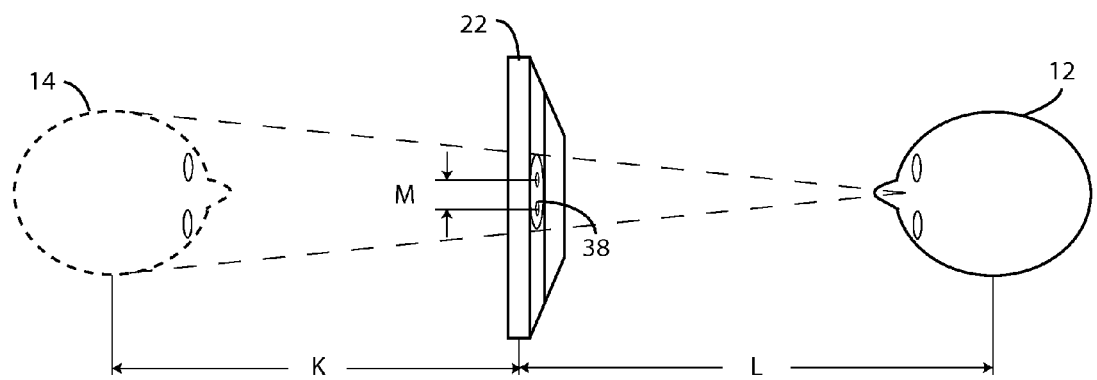
FIG. 5 depicts an exemplary strip segment of a video image according to an embodiment.

FIG. 5 provides an example showing local collaborator 12 and a virtual remote collaborator 14. Virtual remote collaborator 14 is positioned a virtual distance (K) behind display device 22 opposite local collaborator 12. Local collaborator 12 is assumed to be positioned a distance (L) in front of display device 22. The virtual distance (K) may be preselected such that the sum of distance (K) and distance (L) equals a desired conversation distance, four feet for example. Gaze 38 of remote collaborator 14 is scaled in size on display device 22 with eyes spaced apart a distance (M) such that, to local collaborator 12, remote collaborator 14 appears to be positioned behind display device 22 at the virtual distance (K).

Figure 6:
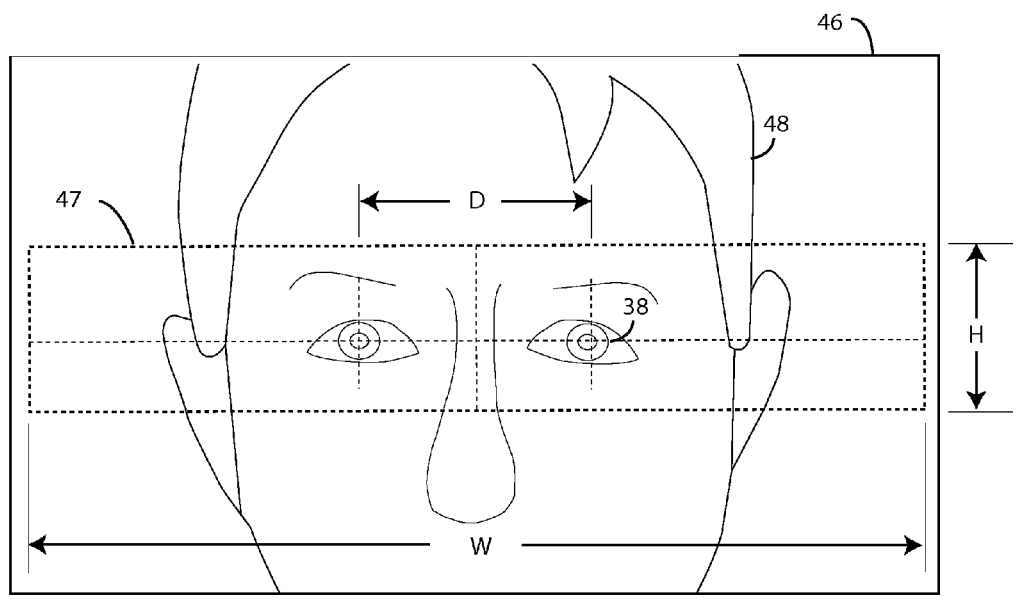
FIGS. 6-9 depict various examples in which strip segments are scaled and oriented with respect to a video image according to various embodiments.

FIG. 6 depicts an example of a video image 46 and corresponding strip segment 47. Video image 46 includes an image of remote collaborator 48. Strip segment 47, having dimensions H, W, and D, is positioned to encompass gaze 38 of remote collaborator 48. The term gaze is used refer to the fixed look of the collaborator and thus includes one or both of a collaborator's eyes. Dimension W corresponds to an elongated width of strip segment 47 while H corresponds to a height. W and H are proportional to the dimensions of the frame (such as frame 30) in which strip segment 46 is to be displayed. Dimensions W and H are also proportional to dimension D which corresponds to a distance between the collaborator's eyes within video image 46.

Thus, with respect to FIG. 6, strip segment 47 is established by detecting facial features such as eyes within a video image 46. Other features that could be used include the output of a face detector, or the outline of the head region obtained from foreground/background segmentation. Dimension D between the eyes is identified. Dimensions W and H are then determined according to known ratios between dimensions D, H and W. Those known ratios are dependent upon the dimensions of the frame in which strip segment is to be displayed. Dimensions W, H, and D may, for example, be measured in pixels. It is also noted that strip segment 47 may be rotated to reflect an offset (⊖) with respect to video image 46. The offset (⊖) can correspond to a relative orientation of the collaborator's eyes within video image 46. In FIG. 6, the borders of strip segment 47 are parallel to the borders of video image 46. However, as is shown in FIGS. 7-9, the strip segment may have a rotational offset (⊖) when the collaborator's head is tilted within the video image.

Figure 7:
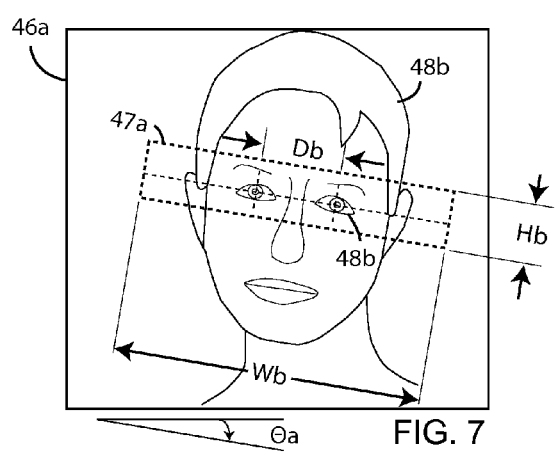
Figure 8:
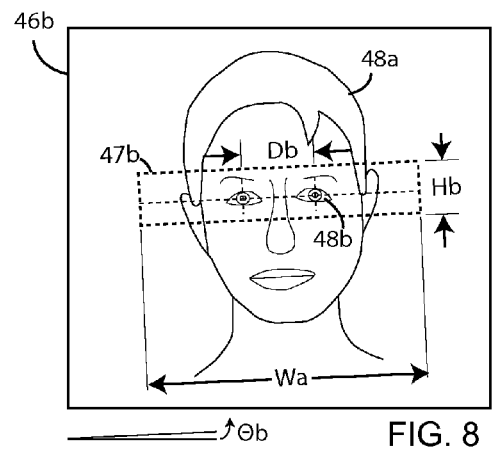
Figure 9:
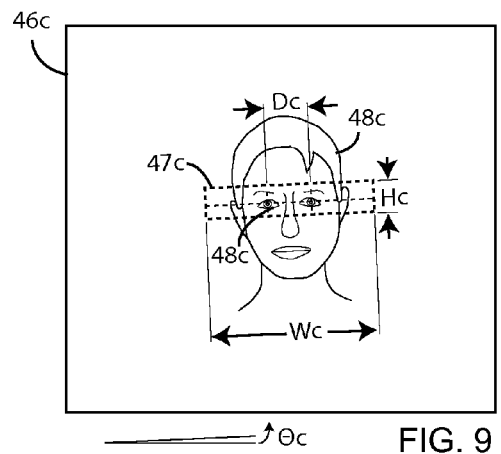

As depicted in FIGS. 7-9, distances Da-c between a collaborator's eyes vary within video images 46a-c depending upon a distance between collaborator 48 and the video capture device used to capture the video images. Thus, dimensions Wa-c and Ha-c of strip segments 47a-c vary between video images 46a-c. Further, each strip segment 47a-c has a rotational offset ⊖a-c that corresponds to a rotational offset of the collaborator's eyes within video images 46a-c. So, before displaying gaze 38a-c of a given strip segment 47a-c in a frame, the strip segment 47a-c is scaled to fit the dimensions of that frame. If rotated to include offset (⊖) as mentioned above, the given strip segment 47a-c may be oriented and scaled to fit the frame dimensions. In this manner, gaze 38a-c is displayed in a life-size fashion to a local collaborator within the limited confines of a display device.

Additionally, strip segments 47a-c are mirrored about a vertical axis prior to display in a frame. Mirroring allows for gaze direction to be communicated accurately. From the perspective of the local collaborator, when the remote collaborator looks to their left, the displayed gaze of the remote collaborator also looks to the left. Likewise, when the remote collaborator looks to their right, the local collaborator sees the displayed gaze looking to the right.

Figure 10:
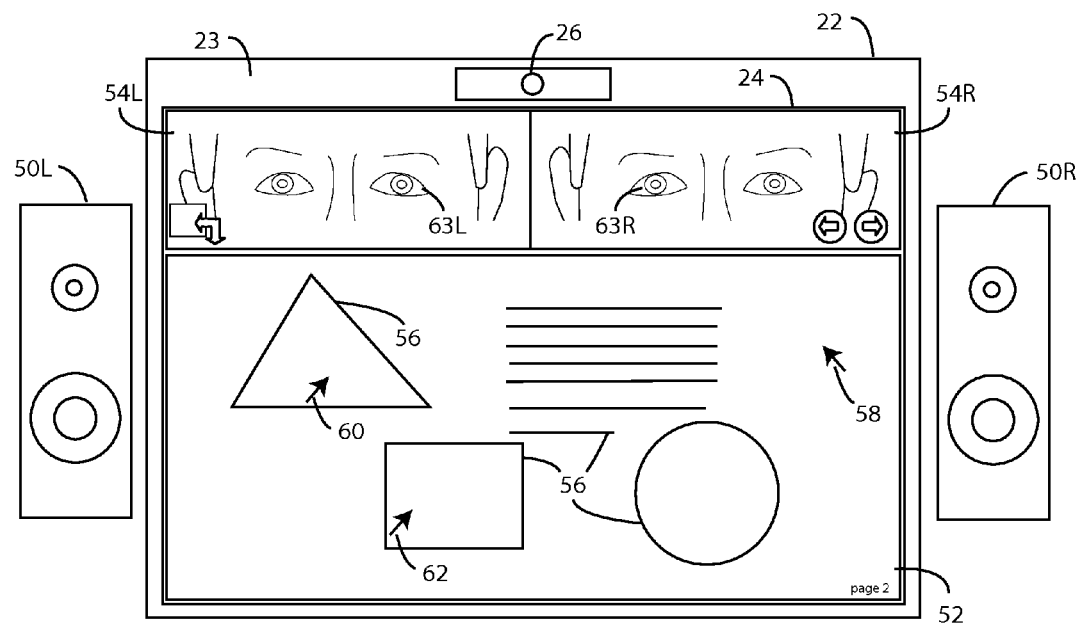
FIGS. 10-12 depict exemplary screen views according to embodiments.

ADDITIONAL COLLABORATORS: The previous examples of FIGS. 2-9 presume the existence of two collaborators. However it is possible to include additional collaborators. FIG. 10 depicts display device 22 along with speakers 50L and 50R. Screen 24 of display device 22 includes frames 52, 54L and 54R. Frame 52 displays shared collaboration content 56, cursor 58 of a local collaborator and cursors 60 and 62 of two remote collaborators. Frame 54L includes gaze 63L of one remote collaborator, while frame 54R includes gaze 63R of the second remote collaborator. In order to more readily associate a cursor with a particular remote collaborator, the cursors 60 and 62 and frames around the images of the remote collaborators could be color-coded, or connected by a line drawn on the display.

When compared to frame 30 of FIGS. 2-4, frames 54L and 54R have a smaller elongated width dimension. In particular, the width is cut in half. Thus, the strip segments of the corresponding video images used to fill those frames 54L and 54R also have a smaller width dimension. Depending on the size of screen 24, the decreased size may prevent gazes 63L and 63R from being shown in a life-size fashion. Nonetheless, the strip segments can be established such that gazes 63L and 63R substantially fill frames 54L and 54R respectively.

In addition to displaying shared collaboration content like 56 and gazes 63L and 63R, the collaboration session may include sharing audio content via microphones (not shown) and speakers (shown as 50L and 50R for the local collaborator). In doing so, audio signals received from the remote collaborators are multiplexed and broadcast via speakers 50L and 50R. The audio signals are multiplexed such that the audio signal corresponding to the remote collaborator whose gaze 63L appears in frame 54L is broadcast primarily through speaker 50L. Likewise, the audio signal corresponding to the remote collaborator whose gaze 63R appears in frame 54R is broadcast primarily through speaker 50R. Should screen 24 include another frame positioned between frames 54L and 54L, the audio signal corresponding to a remote collaborator whose gaze appears in that frame would broadcast more equally through speakers 50L and 50R. In this fashion, the speakers 50L and 50R spatially broadcast voices of the remote collaborators directionally according to the relative positioning of the gazes 63L and 63R of those remote collaborators. The local collaborator can then spatially distinguish audio originating from each of the remote collaborators.

In the above example, it is presumed that each remote collaborator is gazing at a different complimentary remote display device (not shown) that includes first remote frames displaying the gaze of the local collaborator and the other remote collaborator. As with display device 22, the first remote frames for each remote display device are positioned above a second remote frame displaying the shared content. The first remote frames are positioned below a remote video capture device used to capture video images of that particular remote collaborator. Thus, when a given remote collaborator looks at the first remote frame displaying the local collaborator's gaze, the image of that remote collaborator appears, on display device 22, to be gazing out of frame 54L or 54R at the local collaborator. When that remote collaborator looks at the second remote frame displaying the shared content, the image of that remote collaborator on display device 22 appears to be gazing down at frame 52 containing shared content 56.

Figure 11:
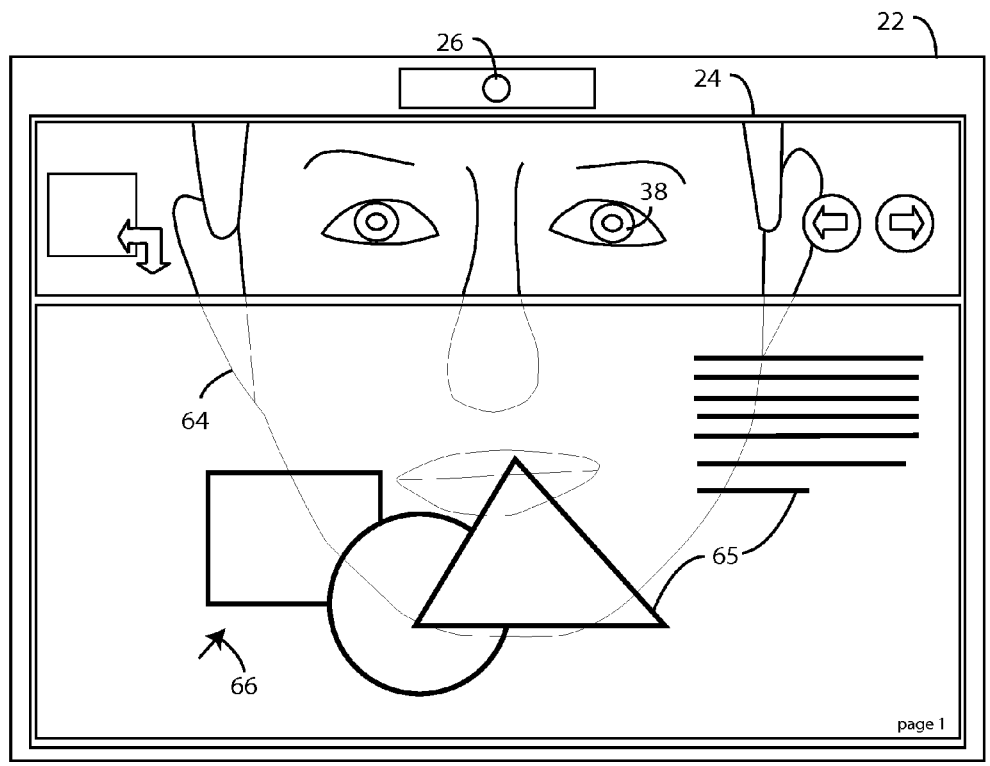
Figure 12:
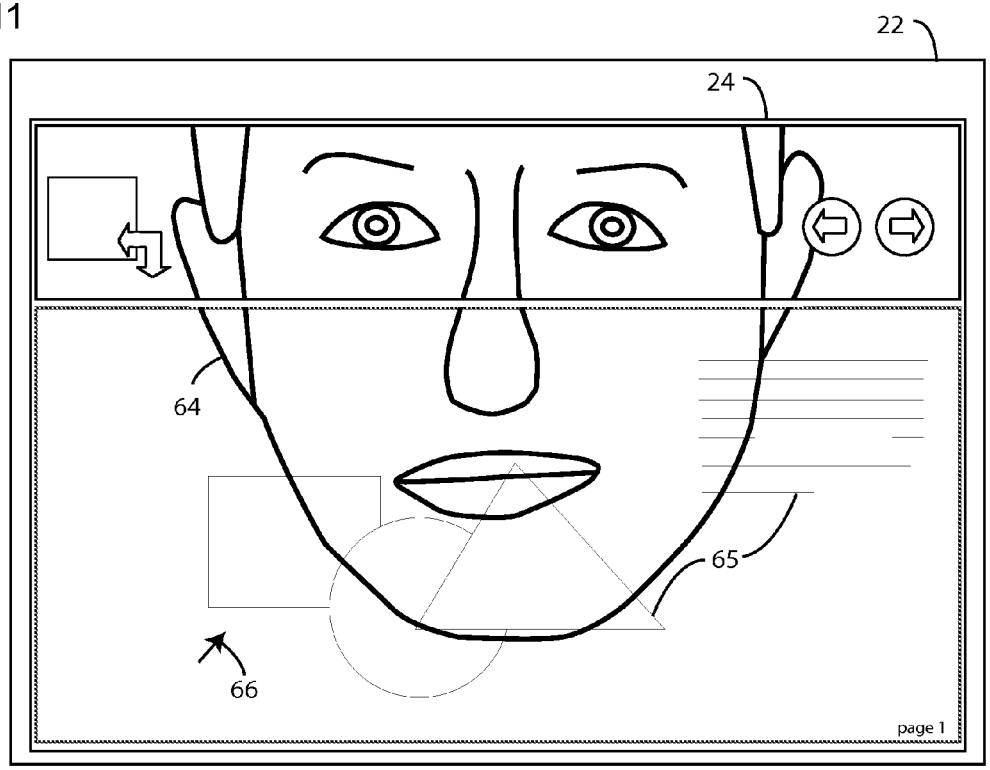

SUPERIMPOSING AND PARALLAX: In FIGS. 2-10, only the gaze of the remote collaborator is displayed on screen 24 allowing the collaborators to interact with shared content positioned below that gaze. As depicted in the examples of FIGS. 11 and 12, an additional segment of the captured video of the remote collaborator, image 64, can be superimposed with shared content 65. In FIG. 11, emphasis is placed on shared content 65. The emphasis may be accomplished by increasing the transparency of image 64 and increasing the opacity of shared content 65. In FIG. 12, emphasis is placed on image 64 by increasing the transparency of shared content 65 and increasing the opacity of image 64.

In FIG. 11, the emphasis draws a viewer's attention to shared content 66, while in FIG. 12 the emphasis draws the viewer's attention to image 64. The change in emphasis back and forth between image 64 and shared content 65 can be based on the viewer's manual selection or it may be caused by sensing activity or lack thereof. For example, a lack of activity may be detected with respect to cursor 66 causing image 64 to be emphasized. Sensed activity with respect to cursor 66 may cause shared content 65 to be emphasized.

Figure 13:
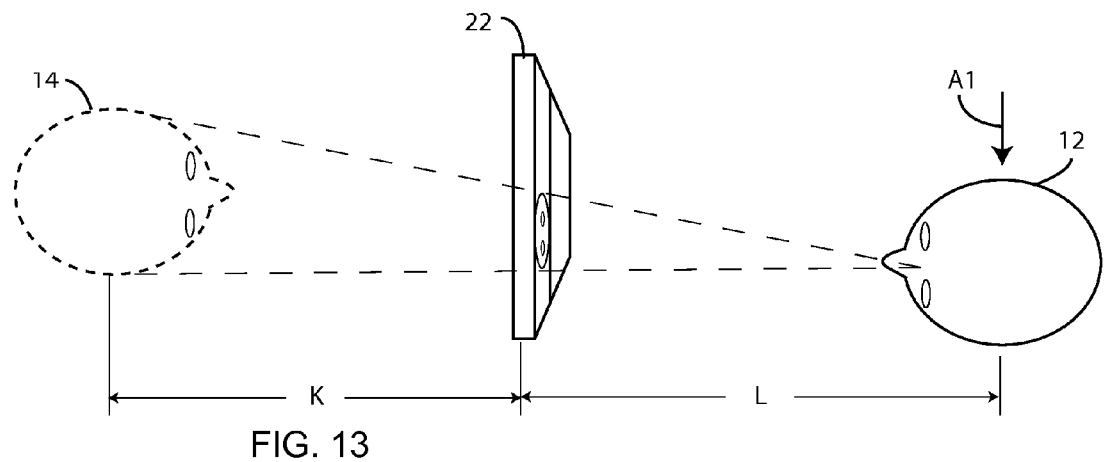
FIGS. 13 and 14 depict an image of remote collaborator according to an embodiment encompassing motion parallax.
Figure 14:
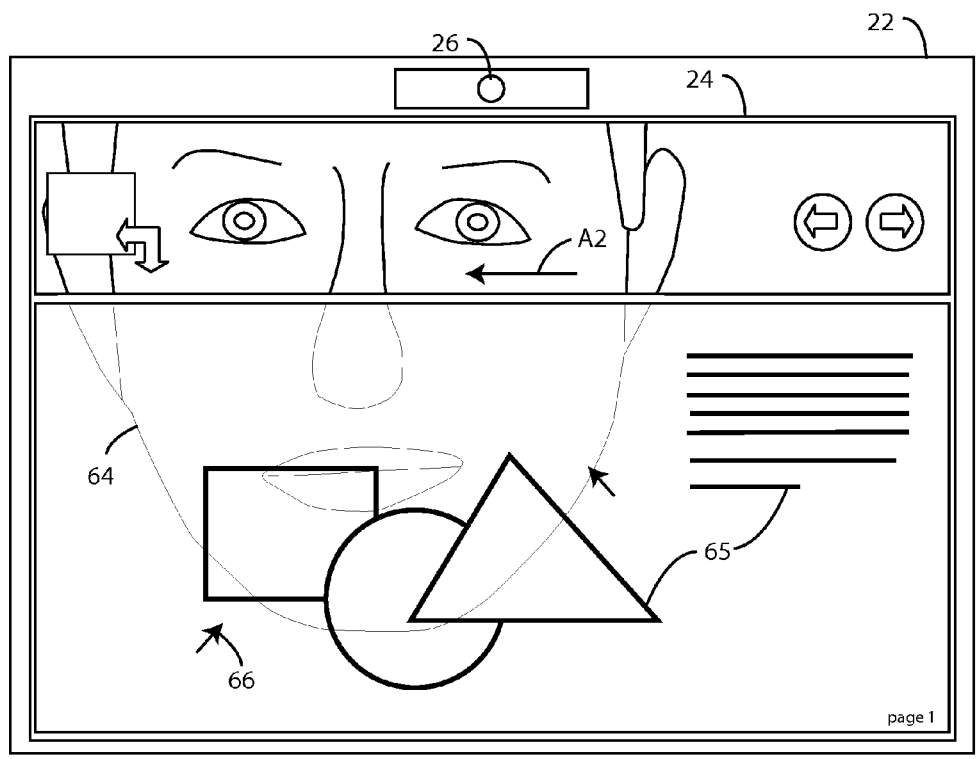

With image 64 and shared content 65 superimposed, the viewer may, at times find it difficult to distinguish between the two. To help the viewer disambiguate the superimposed imagery, motion parallax may be simulated between shared content 65 and image 64 as depicted in the examples of FIGS. 13 and 14. Referring first to FIG. 13, local collaborator observes an image of remote collaborator 14 as if remote collaborator 14 were positioned a virtual distance (K) behind display device 22. Should local collaborator 12 shift position with respect to display device 22 as indicated by arrow (A1), the gaze of remote collaborator 14 on display device 22 should also shift providing the local collaborator with a more natural and realistic experience. Referring to FIG. 14, as local collaborator 12 views display device 22, images of local collaborator 12 are captured and streamed for viewing by remote collaborator 14. Before those images are sent, they can be examined to detect movement of local collaborator 12 with respect to display device 22. This may occur as part of the process of locating the strip segment containing the local collaborator's gaze that will be transmitted to the remote collaborator. In FIG. 13, local collaborator shifted a direction and distance indicated by arrow (A1). Based on the detected shift, image 64 of remote collaborator 14 is shifted a corresponding distance and direction indicated by arrow (A2) in FIG. 14. Distance and direction (A2) is selected to simulate motion parallax providing an appearance that remote collaborator 14 is positioned behind display device 22. Referring to FIG. 13, the magnitude of shift (A2) is a function of the distance and direction indicated by arrow (A1), the virtual distance (K), and the assumed distance (L).

COMPONENTS: FIGS. 15-18 depict various physical and logical components that function as system 68. System 68 is shown to include image engine 70, display engine 72, and audio engine 74. Image engine 70 represents generally any combination of hardware and programming configured to examine a video image to locate therein a strip segment containing desired facial features of an individual depicted. In the present context, that individual is a second or remote collaborator. Such facial features can, for example, include the individual's gaze. FIGS. 6-9, discussed above, depict examples of strip segments containing the gaze of a remote collaborator.

Image engine 70 sizes the strip segment according to dimensions of a user interface frame in which the strip segment is to be displayed. This frame, referred to as a second frame, is positioned above a first frame for displaying shared content. Image engine 70 also sizes the dimensions of the strip segment according to a dimension of the facial features of the individual as depicted in the video image. Such a facial feature dimension may be a distance between the individual's eyes. Based on a dimension of the facial feature, image engine 70 can select a proportional elongated width of the strip segment. In a given example, the elongated width may be a predetermined multiple of the facial feature dimension. A height of the elongated strip can then be selected such that the dimensions of the elongated strip are proportional to the second frame in which the strip segment is to be displayed. Image engine 70 also orients and positions the strip segment relative to an orientation and position of the facial features within the particular video image. In a particular example, image engine 70 orients and positions the strip segment such that eyes of the individual depicted in the video image are generally centered within the strip segment as depicted in FIGS. 6-9.

Image engine 70 may also locate a second segment below the strip segment within the video image. The two segments combine to form an image of the remote collaborator. The strip segment contains the remote collaborator's gaze, while the second segment contains additional facial features. The second segment may be scaled to fit the first frame and superimposed with shared content in the first frame of the user interface positioned below the second frame. Thus, the dimensions of the second segment are selected to be proportional to the first frame.

To simulate motion parallax, image engine 70 may examine video images of the local collaborator to detect motion of the local collaborator relative to the display screen. Image engine 70 then identifies a vector defining the detected motion of the local collaborator with display screen. Image engine 70 utilizes that vector to reposition the strip segment and the second segment (if utilized) with respect to the video image. For example, upon detecting that the local collaborator has moved to their left, image engine 70 repositions the segments so that the remote collaborator's gaze also moves to the left within the strip segment. Likewise, upon detecting that the local collaborator has moved to their right, image engine 70 repositions the segments so that remote collaborator's gaze also moves to the right within the strip segment. An example is discussed above with respect to FIGS. 13-14.

Display engine 72 represents generally any combination of hardware and programming configured to cause, on a display device positioned for a first or local collaborator, a display of the strip segment in a frame of a graphical user interface. In this context, that frame is the second frame positioned above the first frame used to communicate shared collaboration content. In performing its function, display engine 72 orients, scales, and mirrors the strip segment. Display engine 72 scales the strip segment so that the facial features of the individual depicted as displayed have a desired dimension. That desired dimension is calculated as a function of:

a virtual distance at which the remote collaborator appears to be positioned behind the display device, and an assumed distance between the local collaborator and the display device.

Referring to FIGS. 5 and 13, distance (K) represents the virtual distance while distance (L) represents the assumed distance. For example, the virtual and assumed distances may be each set at two feet. Assuming the average distance between a person's eyes is three inches, display engine 72 scales the strip segment such that the distance between the remote collaborator's eyes (as displayed) is one and a half inches.

In implementations with multiple remote collaborators, a given graphical user interface may include frames positioned side by side one another above the first frame for displaying the shared collaboration content. FIG. 10 provides an example. Each of the upper frames is configured to display a gaze of a given remote collaborator. In such an implementation, image engine 70 is responsible for analyzing a video image for each remote collaborator and locating an appropriate strip segment containing the desired facial feature of that collaborator. Display engine 72 is then responsible for displaying those strip segments in the upper, side by side frames.

Referring back to FIGS. 11 and 12, display engine 72 may scale the second segment located by image engine 70 to fit the first frame of the user interface and superimpose the second segment with the shared content in the first frame. In doing so, display engine 72 may emphasize one over the other. For example, display engine 72 may detect that mouse activity or other user input indicating attention being drawn to the shared content of the first frame. As a result, display engine 72 emphasizes the shared content over the image of the remote collaborator. Display engine 72 may detect a lack of input concerning the shared content of the first frame indicating that the collaborators are conversing. As a result, display engine 72 emphasizes the image of the remote collaborator.

Audio engine 74 represents generally any combination of hardware and programming configured to spatially multiplex a first audio signal corresponding to one remote collaborator with second audio content corresponding to a second remote collaborator. Audio engine 74 is also responsible for causing a broadcast of the spatially multiplexed first and second audio signals on a multichannel audio device positioned for the local collaborator. Thus, where two or more strip segments are displayed side by side in frames of a graphical user interface, the local collaborator can spatially distinguish voices of the remote collaborators. Based on an apparent direction from which a given voice emanates, the local collaborator can visually associate that voice with a display of a given strip segment containing the gaze of a remote collaborator to whom the voice belongs.

Figure 15:
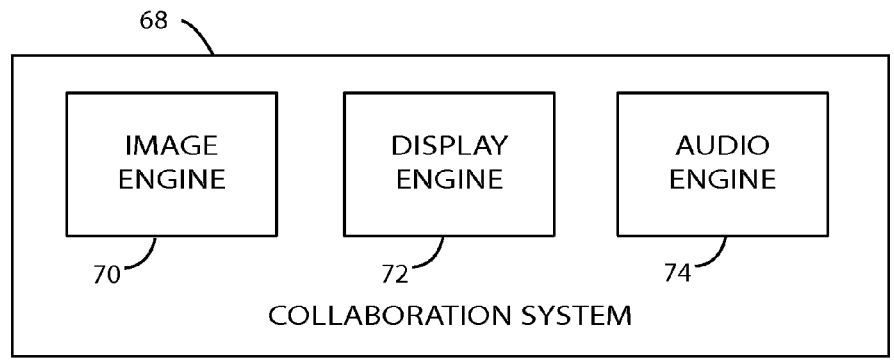
FIG. 15 is an exemplary depiction of a collaboration system according to an embodiment.
Figure 16:
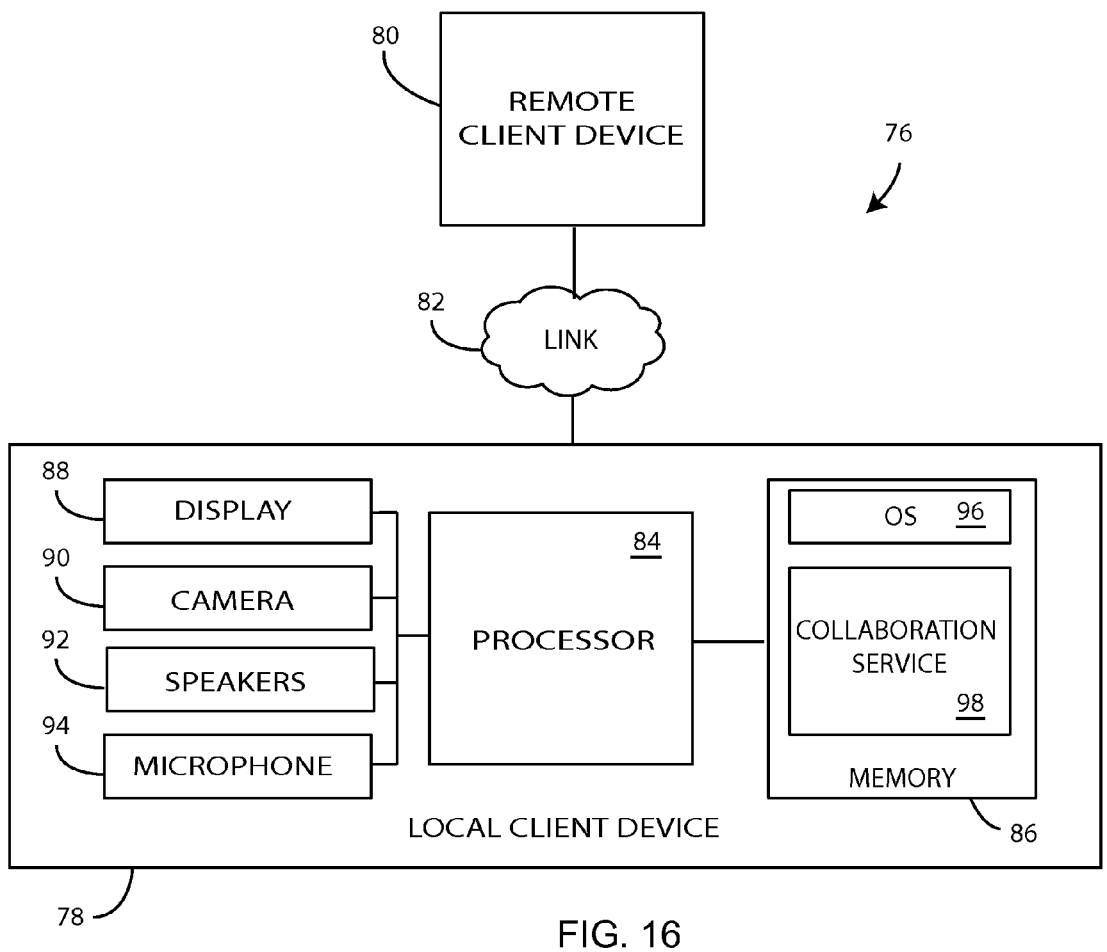
FIGS. 16-18 are exemplary depictions of environments in which the system of claim 10 may be implemented according to various embodiments.

System 68 of FIG. 15 may be implemented in a number of environments such as environment 76 of FIG. 16. Environment 76 includes local client device 78 and remote client device 80 interconnected via link 82. Client devices 78 and 80 represent generally any computing devices configured to execute program instructions. Link 82 represents generally one or more of a cable, wireless, fiber optic, or remote connection via a telecommunication link, an infrared link, a radio frequency link, or any other connector or system that provides electronic communication. Link 82 may represent an intranet, the Internet, or a combination of both. The paths followed by link 82 between client devices 78 and 80 as depicted in FIG. 16 represent the logical communication paths between these devices, not necessarily the physical paths between the devices.

In the example of FIG. 16, local client device 78 includes processor 84, memory 86, display 88, camera 90, speakers 92, and microphone 94. It is noted that, while not shown, remote client device 80 includes complimentary components. In other words, remote client device 80 includes a processor, memory, a display, a camera, a microphone, and speakers.

Processor 84 represents generally any device capable of executing program instructions stored in memory 86. Memory 86 represents generally any memory configured to store program instructions and other data. Display 88 represents generally any display device capable of displaying a graphical user interface at the direction of processor 84. Where local client device 78 is a notebook computer, display 88 may be an integrated display device as depicted in the examples of FIGS. 1-4. In other examples, display 88 may be a separate device such as an LCD monitor or television.

Camera 90 represents generally any video capture device. Where for example, local client device 78 is a notebook computer, camera 90 may be a web-cam integrated into the upper edge of the display bezel as depicted in the examples of FIGS. 1-4. In another example, camera 90 may be a separate component capable of clipping onto that bezel. Speakers 92 represent generally stereo speakers capable of broadcasting audio signals. Microphone 94 represents generally any microphone for use in capturing sounds in the vicinity of local client device 78.

Memory 86 is shown to include OS (operating System) 96 and collaboration service 98. OS 130 represents generally any software platform on top of which other programs or applications such as collaboration service 98 run. Examples include Linux® and Microsoft Windows®. In this example, OS 96 includes drivers for controlling the operation of components 88-94. In particular, these drivers translate generic commands into device specific commands capable of being utilized by components 88-94.

Collaboration service 98 represents generally any programming that, when executed, implements the functionality of image engine 70, display engine 72, and audio engine 74 of FIG. 15. As noted above, the various components of system 68 of FIG. 15 include combinations of hardware and programming. With respect to FIG. 16, the hardware components may be implemented though processor 84. The programming elements may be implemented via collaboration service 98.

In a particular embodiment, local client device 78 receives a video stream containing the gaze of a remote collaborator using remote client device 80. Collaboration service 98, when executed, examines video images from that stream to locate therein a strip segment containing the gaze of the remote collaborator. Collaboration service 98 sizes the strip segment according to a dimension of the facial features of the individual depicted in the video image and dimensions of the user interface frame in which the strip segment is to be displayed on display 88. Collaboration service 98 also positions the strip segment relative to an orientation and position of the facial features within the particular video image.

Once the strip segment is oriented, sized, and positioned, collaboration service 98 causes, on display 88, a display of the strip segment in a frame of a graphical user interface. That frame is positioned above another frame used to communicate shared collaboration content and below camera 90. Collaboration service 98 orients and scales the strip segment to fit the given frame. Collaboration service 98 is also responsible for causing a display of the shared collaboration content within the lower frame on display 88.

Figure 17:
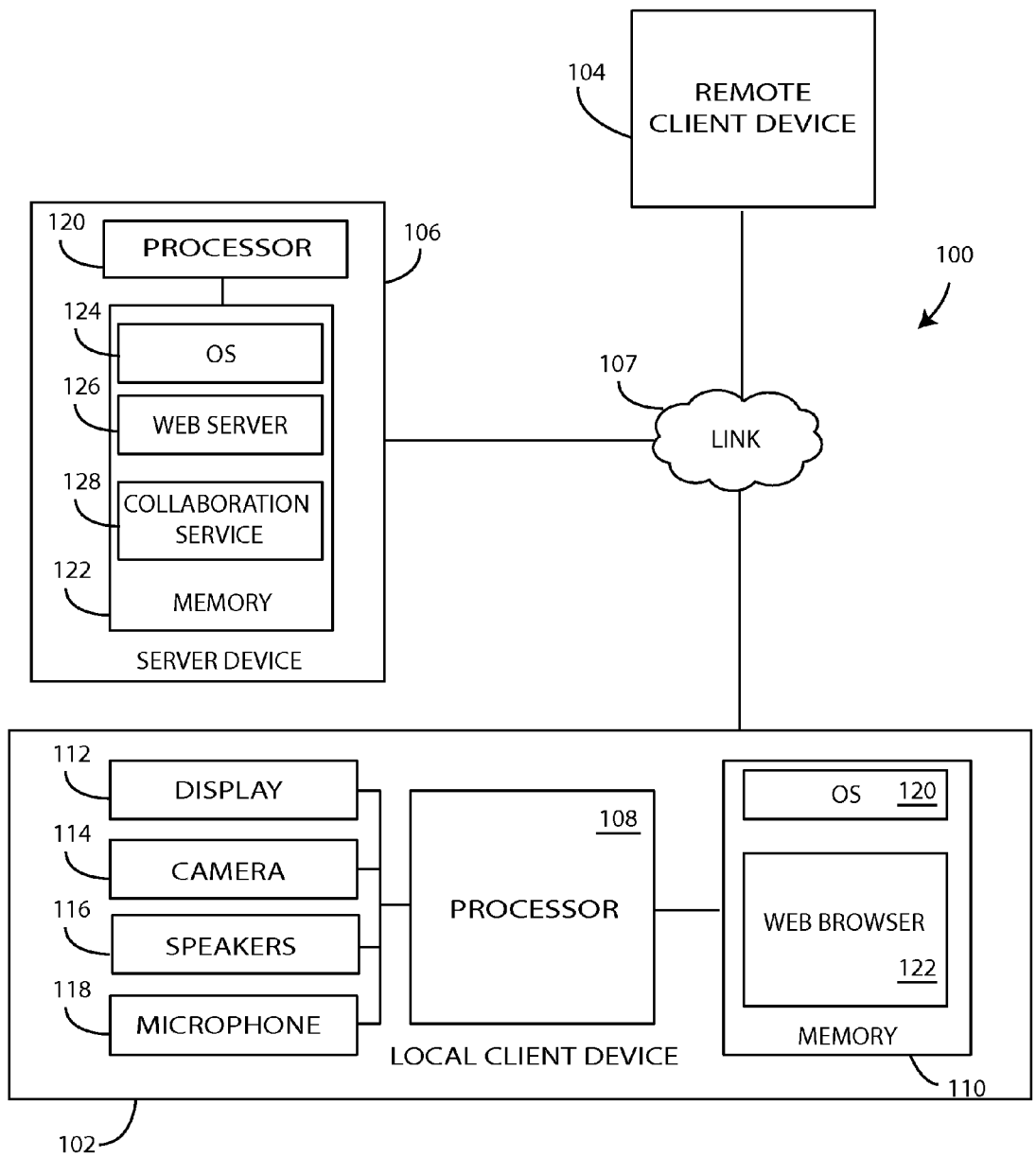

System 68 of FIG. 15 may be implemented in environment 100 of FIG. 17. Environment 100 includes local client device 102, remote client device 104, and server device 106 interconnected via link 107. Client devices 102 and 104 and server device 106 represent generally any computing devices configured to execute program instructions. Link 107 represents generally one or more of a cable, wireless, fiber optic, or remote connection via a telecommunication link, an infrared link, a radio frequency link, or any other connector or system that provides electronic communication. Link 107 may represent an intranet, the Internet, or a combination of both. The paths followed by link 107 between client devices 102 and 104 and server device 106 as depicted in FIG. 17 represent the logical communication paths between those devices, not necessarily the physical paths between the devices.

In the example of FIG. 17, local client device 102 includes processor 108, memory 110, display 112, camera 114, speakers 116, and microphone 118. It is noted that, while not shown, remote client device 104 includes complimentary components. In other words, remote client device 104 includes a processor, memory, a display, a camera, a microphone, and speakers.

Processor 108 represents generally any device capable of executing program instructions stored in memory 110. Memory 110 represents generally any memory configured to store program instructions and other data. Display 112 represents generally any display device capable of displaying a graphical user interface at the direction of processor 108. Camera 114 represents generally any video capture device. Speakers 92 represent generally stereo speakers capable of broadcasting audio signals. Microphone 94 represents generally any microphone for use in capturing sounds in the vicinity of local client device 78.

Memory 110 is shown to include OS (Operating System) 120 and web browser 112. OS 120 represents generally any software platform on top of which other programs or applications such as web browser 122 run. Examples include Linux® and Microsoft Windows®. In this example, OS 120 includes drivers for controlling the operation of components 112-118. In particular, these drivers translate generic commands into device specific commands capable of being utilized by components 112-118. Web browser 122 represents generally any programming that, when executed, requests, obtains and causes the presentation of web content. In particular, web browser 122 requests sand receives such web content from service device 106 and causes that content to be presented via display 114 and speakers 116.

Server device 106 is shown to include processor 120 and memory 122. Processor 120 represents generally any device capable of executing program instructions stored in memory 122. Memory 122 represents generally any memory configured to store program instructions and other data. Memory 122 is shown to include OS (Operating System) 124, web server 126, and collaboration service 128. OS 124 represents generally any software platform on top of which other programs or applications such as web server 126 and collaboration service 128 run. Examples include Linux® and Microsoft Windows®.

Web server 126 represents generally any programming that, when executed, serves requested content supplied by collaboration service 126 and thus causes the presentation of that content by local client device 102. Collaboration service 128 represents generally any programming that, when executed, implements the functionality of image engine 70, display engine 72, and audio engine 74 of FIG. 15. As noted above, the various components of system 68 of FIG. 15 include combinations of hardware and programming. With respect to FIG. 17, the hardware components may be implemented though processor 120. The programming elements may be implemented via collaboration service 126.

In a particular embodiment, server device 106 receives a video stream containing the gaze of a remote collaborator using remote client device 104. Collaboration service 128, when executed, examines video images from that stream to locate therein a strip segment containing the gaze of the remote collaborator. Collaboration service 128 sizes the strip segment according to a dimension of the facial features of the individual depicted in the video image and dimensions of the user interface frame in which the strip segment is to be displayed on display 114 of local client device 102. Collaboration service 128 also orients and positions the strip segment relative to an orientation and position of the facial features within the particular video image.

Once the strip segment is oriented, sized, and positioned, collaboration service 128 causes, on display 114, a display of the strip segment in a frame of a graphical user interface. In doing so, collaboration service 128 causes web server 126 to return corresponding content to local client device 102. In response, web browser 122 displays the strip segment on display 114 in a frame positioned above another frame used to communicate shared collaboration content and below camera 112. Collaboration service 128 orients and scales the strip segment to fit the given frame. Collaboration service 128 is also responsible for causing web server 126 to supply the shared collaboration content for web browser 122 to display within the lower frame on display 112.

Figure 18:
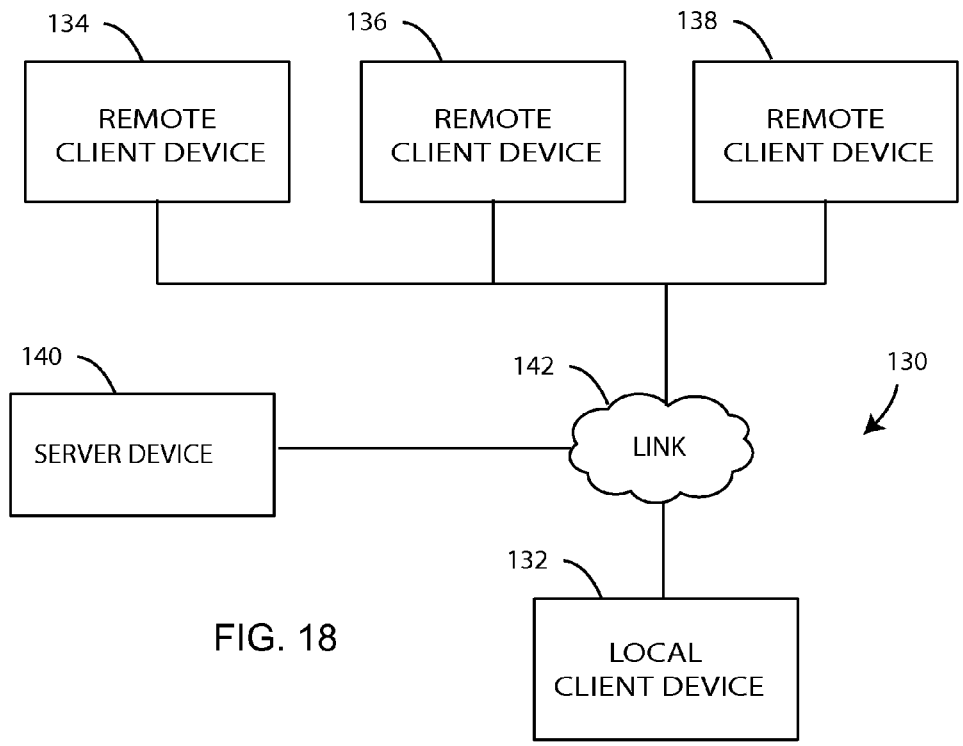

Moving to FIG. 18, system 68 of FIG. 10 may be implemented in environment 130. Environment 130 includes local client device 132, remote client devices 134-138, and server device 140 interconnected via link 142. Client devices 132-138 and server device 140 represent generally any computing devices configured to execute program instructions. Link 142 represents generally one or more of a cable, wireless, fiber optic, or remote connection via a telecommunication link, an infrared link, a radio frequency link, or any other connector or system that provides electronic communication. Link 142 may represent an intranet, the Internet, or a combination of both. The paths followed by link 142 between client devices 132-138 and server device 140 as depicted in FIG. 13, represent the logical communication paths between those devices, not necessarily the physical paths between the devices.

As noted above, the various components of system 68 of FIG. 15 include combinations of hardware and programming. With respect to FIG. 18, the hardware components may be implemented though a processor of server device 140. The programming elements may be implemented as programming executed by that processor.

In a particular embodiment, server device 106 receives a video stream containing the gazes of remote collaborators using remote client devices 134-138. Server device 140 examines video images from those streams to locate therein strip segments containing the gazes of the remote collaborators. Server device 140 sizes the strip segments according to dimensions of the facial features of the individuals depicted in the video images and dimensions of the user interface frames in which the strip segments are to be displayed by local client deice 132. Server device 140 also positions each strip segment relative to the orientation and position of the facial features within the corresponding video image.

Once the strip segment sized and positioned, server device 140 provides for, via local client device 132, a display of the strip segments in corresponding side by side frames of a graphical user interface. In doing so, those frames are positioned below a video capture device and above a frame containing shared collaboration content. Server device 140 orients and scales each strip segment to fit its corresponding frame. Server device 140 is also responsible for supplying the shared collaboration content for local client device 132 to display within the lower frame of the graphical user interface.

In addition to the above tasks, server device 140 receives audio signals from remote client device 134-138. Server device 140 spatially multiplexes the audio signals and provided the resultant multiplexed signal to be broadcast by local client device 132 via a multichannel audio device positioned for a local collaborator. The voice of the remote collaborator whose gaze appears in the left most frame is broadcast primarily via a left speaker of the multichannel audio device. The voice of the remote collaborator whose gaze appears in the right most frame is broadcast primarily via a right speaker of the multichannel audio device. The voice of the remote collaborator whose gaze appears in between the left and right most frames is broadcast primarily via both the left and the right speakers of the multichannel audio device. Thus, in this example where two or more strip segments are displayed side by side in frames of a graphical user interface, the local collaborator can spatially distinguish voices of the remote collaborators. Based on an apparent direction from which a voice emanates, the local collaborator can visually associate that voice with a display of a given strip segment containing the gaze of a remote collaborator to whom the voice belongs.

Figure 19:
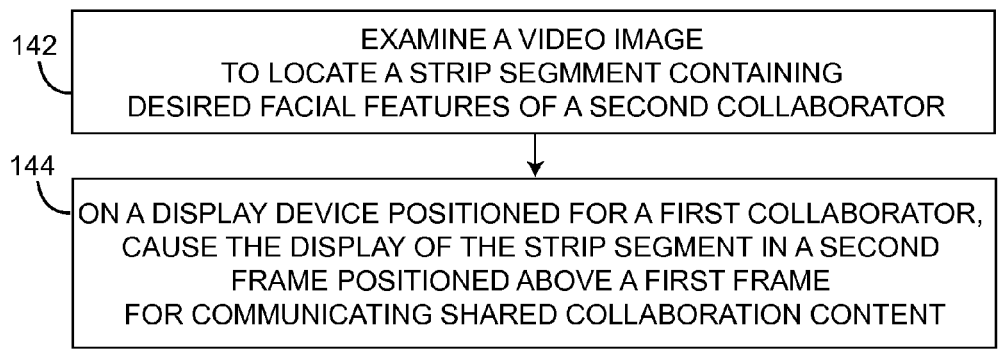
FIGS. 19 and 20 are flow diagrams depicting steps take to implement various embodiments.
Figure 20:
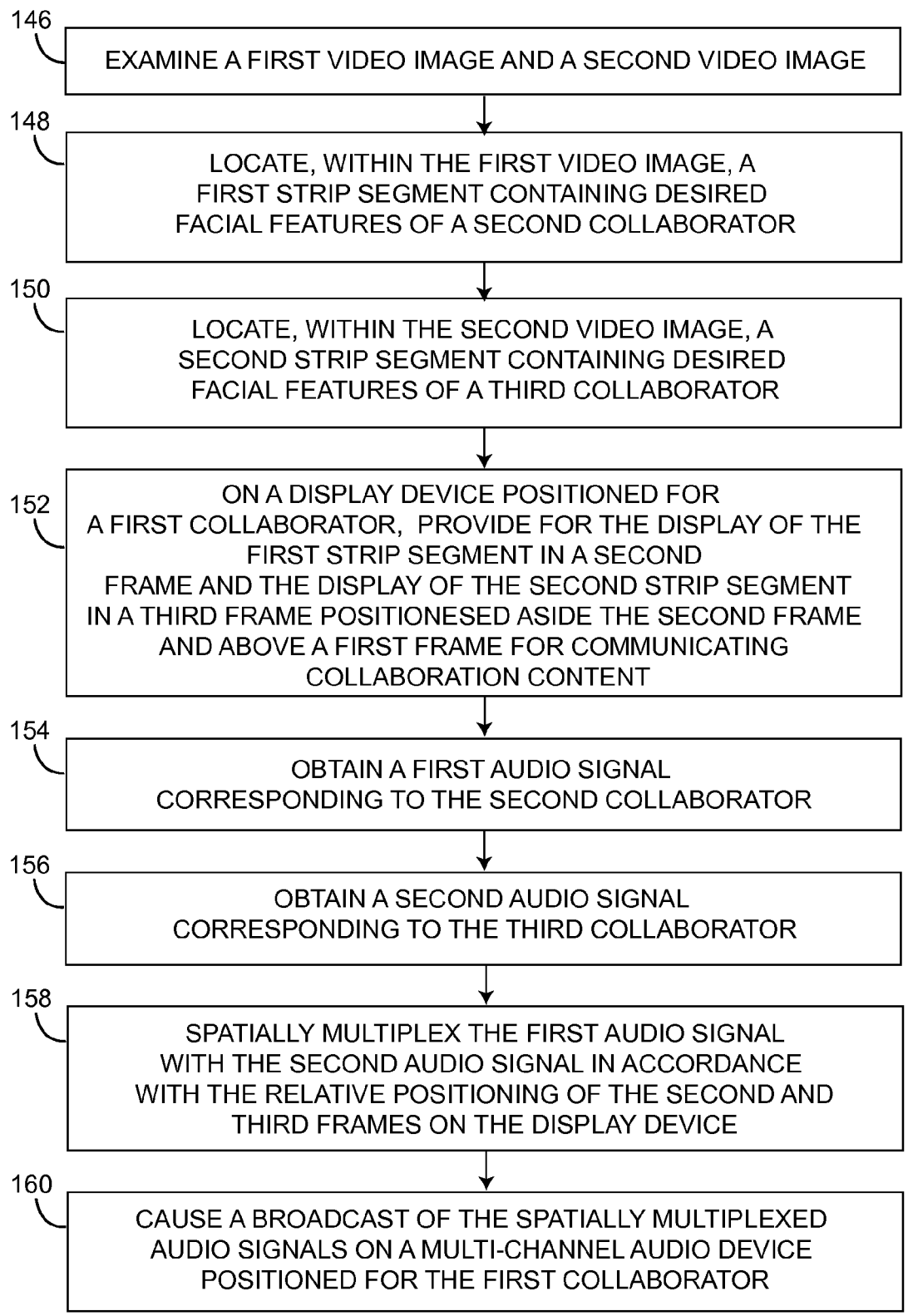

OPERATION: FIGS. 19-20 are exemplary flow diagrams of steps taken to implement various embodiments in which content is shared between a first collaborator and a second collaborator via a graphical user interface the includes first and second frames. In discussing FIGS. 19-20, reference may be made to the diagrams of FIGS. 1-18 to provide contextual examples. Implementation, however, is not limited to those examples.

Starting with FIG. 19, a video image is examined to locate a strip segment containing desired facial features of the second collaborator (step 142). On a display device positioned for the first collaborator, the strip segment is caused to be displayed in the second frame above the first frame which is used for communicating shared collaboration content (step 144). Referring back to the example FIG. 15, image engine 70 may be responsible for implementing step 142, and display engine 82 may be responsible for implementing step 144.

Examples of strip segments are depicted in FIGS. 6-9. Step 142 can include sizing the strip segment according to a dimension of the facial features. Such a dimension may be a distance between the eyes of the second collaborator. Step 142 can involve sizing the strip segment according to a dimension of the facial features and a dimension of the second frame. As discussed above with respect to FIGS. 2-5, the strip segment may be sized such that its dimensions are at least initially proportional to the dimensions of the second frame and the dimension of the facial features of the second collaborator within the video image. Step 142 can include orienting and positioning the strip segment according to a relative orientation and position of the facial features within the video image.

Step 144 can include mirroring, orienting, and scaling the strip segment to provide an appearance, to the first collaborator, that the second collaborator is positioned at a selected virtual distance behind the display device as depicted in the examples of FIGS. 2-9. Further step 144 can include causing the display of the strip segment in the second frame positioned below an expected position of a video capture device and above the first frame for communicating the shared collaboration content. Again, examples are depicted in FIGS. 2-9.

Step 144 can also include scaling and superimposing a second segment of the video image with the shared content in the first frame. In one example, a second segment of the video image is located in step 142. That second segment is positioned immediately below the strip segment. It is expected that the second segment will contain additional facial features of the second collaborator. The dimensions of the second segment are selected to be proportional to the dimensions of the first frame of the user interface in which shared content is to be communicated. Thus, the second segment can be scaled to fit the first frame and superimposed with the shared content. As discussed with respect to FIG. 15 above, image engine 70 may be responsible for locating the second segment, while display engine 72 is responsible for superimposing the second segment with the shared content.

Thus, the strip segment and second segment, when displayed, combine to form an image of the second collaborator. The strip segment contains the second collaborator's gaze, while the second segment contains additional facial features. One of the shared content and the second segment is emphasized over the other based on detected activity with respect to the first frame. The detected activity may include the motion of a cursor caused by a collaborator. As a result, the shared content can be emphasized by increasing the transparency of the second segment while increasing the opacity of the shared content. The detected activity may instead include the lack of motion of the cursor causing the second segment to be emphasized over the shared content. Emphasis, here, can be achieved by increasing the transparency of the shared content while increasing the opacity of the second segment. Examples are discussed with respect to FIGS. 11 and 12 above.

Motion parallax between the shared content and the gaze of the second collaborator can be simulated by repositioning the strip segment with respect to the video image. In cases where a second segment of the video image is to be superimposed with the shared content, that second segment is also repositioned. The direction and extent to which one or both strip segments are repositioned depends upon detected movement of the first collaborator. The simulated motion parallax provides an appearance (to the first collaborator) that the second collaborator is positioned behind the display device and serves to disambiguate the image of the second collaborator from the shared content.

In one example, images of the first collaborator are captured and streamed for display to the second collaborator. Before being streamed, the images are examined to detect a shift in position of the first collaborator with respect to the display device. To simulate motion parallax, the strip segment (or the strip segment and the second segment) is, with respect to the video image, repositioned based on the detected shift in position such that the desired facial features—included in the strip segment—shift to one side or the other. The direction and extent to which one or both segments are repositioned depend upon the following:

a vector defining a the shift in position for the first collaborator;

a virtual distance (discussed above with respect to FIG. 13); and an assumed distance (also discussed above with respect to FIG. 13).

In the example of FIG. 15, image engine 70 is responsible for repositioning the two located segments within the video image. Upon detecting that the first collaborator has moved to their left, image engine 70 repositions the two segments to the right within the video image so that the image of the second collaborator's gaze shifts to the left within the strip segment. Likewise, upon detecting that the first collaborator has moved to their right, image engine 70 repositions the two segments within the video image so that the image of the second collaborator's gaze shifts to the right within the strip segment.

The flow diagram of FIG. 19 discusses two collaborators. However, various implementations allow for three or more collaborators. The flow diagram of FIG. 20 provides an example. A first video image and a second video image are examined (step 146). Within the first video image, a first strip segment containing desired facial features of a second collaborator is located (step 148). Within the second video image, a second strip segment containing desired facial features of a third collaborator is located (step 150). Referring to FIG. 18, first and second video streams may be transmitted by remote client devices 134 and 136 to a server device 140 where the first and second video images can be extracted from those video streams. With respect to FIG. 15, image engine 70 may be responsible for implementing steps 146-150. Examples of strip segment locating are discussed above with respect to FIGS. 5-9.

The first and second strip segments are caused to be displayed on a displayed on a display device positioned for a first collaborator (step 152). The strip segments are displayed as part of a graphical user inter face that includes a first frame for communicating shared collaboration content. The first strip segment is displayed in a second frame, while the second strip segment is displayed in a third frame positioned aside the second fame and above the first frame. With respect to FIG. 15, display engine 72 may be responsible for implementing step 152. FIG. 10 depicts an example of such a graphical user interface.

Steps 148 and 150 can each include sizing the corresponding strip segment according to a dimension of the corresponding facial features. Such a dimension may be a distances between the eyes of the second and third collaborators. Steps 148 and 150 can each involve sizing the corresponding strip segment according to a dimension of the corresponding facial features and a dimension of the corresponding second or third frame. As discussed above with respect to FIGS. 2-5, a strip segment may be sized such that its dimensions are at least initially proportional to the dimension of the facial features of the particular collaborator within the video image and to the dimensions of the frame in which it is to be displayed. Steps 148 and 150 can each also include orienting and positioning the corresponding strip segment according to a relative orientation and position of the facial features within the given video image.

Step 152 can involve orienting and scaling the first and second strip segments to fit the second and third frames as depicted in the examples of FIG. 10. Further step 152 can include causing the display of the first and second strip segments in the second and third frames positioned below an expected position of a video capture device and above the first frame for communicating the shared collaboration content. Again, an example is depicted in FIG. 10.

Continuing with FIG. 20, a first audio signal corresponding to the second collaborator is obtained (step 154). A second audio signal corresponding to the third collaborator is obtained (step 156). The first and second audio signals are spatially multiplexed according to the relative positioning of the second and third frames on the display device (step 158). The spatially multiplexed audio signals are caused to be broadcast via a multi-channel audio device positioned for the first collaborator. Referring to FIG. 18, the first and second audio signals may be transmitted by remote client devices 134 and 136 to a server device 140 or to a local client device 132. With respect to FIG. 15, audio engine 74 may be responsible for implementing steps 154-160.

CONCLUSION: The diagrams of FIGS. 1-14 are used to depict exemplary environments and user interface displays. Implementation, however, is not so limited. FIGS. 15-18 show the architecture, functionality, and operation of various embodiments. Various components illustrated in FIGS. 15-18 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 19-20 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A video collaboration method, comprising:
   examining a video image to locate therein a strip segment containing desired facial features of a second collaborator, wherein the desired facial features include a gaze but not other facial features of the second collaborator; and on a display device positioned for a first collaborator, causing a display of the strip segment in a second frame positioned above a first frame for communicating shared collaboration content such that the other facial features are not displayed in the second frame.

2. The method of claim 1, wherein
examining comprises one or more of:
   sizing the strip segment according to dimensions of the second frame and of the facial features; and
   positioning the strip segment according to a relative orientation and position of the facial features within the video image; and
causing a display of the strip segment includes mirroring and scaling the strip segment to provide an appearance to the first collaborator that the second collaborator is positioned at a selected virtual distance behind the display device.

3. The method of claim 1, wherein causing a display of the strip segment comprises, on the display device, causing a display of a strip segment in a second frame positioned below an expected position of a video capture device and above a first frame for communicating shared collaboration content.

4. The method of claim 1, wherein examining comprises examining a first video image to locate a first strip segment containing desired facial features of the second collaborator and examining a second video image to locate a second strip segment containing desired facial features of a third collaborator; and
   causing a display comprises, on the display device, causing a display of the first strip segment in the second frame and a display of the second strip segment in a third frame, the second and third frames being positioned beside one another and above the first frame for communicating shared collaboration content.

5. The method of claim 4, further comprising:
   with respect to a relative positioning of the second and third frames on the display device, spatially multiplexing a first audio signal corresponding to the second collaborator with second audio content corresponding to the third collaborator; and
   causing a broadcast of the spatially multiplexed first and second audio signals on a multichannel audio device positioned for the first collaborator.

6. The method of claim 1, further comprising examining the video image to locate a second segment positioned below the located strip segment; and wherein causing a display includes:
   superimposing the second segment with the shared content in the first frame; and
   emphasizing one of the second segment and the shared content over the other based on detected activity with respect to the first frame.

7. The method of claim 1, further comprising simulating motion parallax between the shared content and the desired facial features of the second collaborator in accordance with a detected shift in position of the first collaborator with respect to the display device.

8. A non-transitory computer readable medium storing computer executable instructions that when executed cause the implementation of a method; the method comprising:
   examining a video image to locate therein a strip segment containing desired facial features of a second collaborator, wherein the desired facial features include a gaze but not other facial features of the second collaborator; and
   on a display device positioned for a first collaborator, causing a display of the strip segment in a second frame positioned above a first frame for communicating shared collaboration content such that the other facial features are not displayed in the second frame.

9. The medium of claim 8, wherein examining comprises one or more of:
   sizing the strip segment according to a dimension of the facial features and a dimension of the second frame; and
   positioning the strip segment according to a relative orientation and position of the facial features within the video image.

10. The medium of claim 9, wherein causing a display of the strip segment includes mirroring and scaling the strip segment to provide an appearance to the first collaborator that the second collaborator is positioned at a selected virtual distance behind the display device.

11. The medium of claim 8, wherein causing a display of the strip segment comprises, on the display device, causing a display of a strip segment in a second frame positioned below an expected position of a video capture device and above a first frame for communicating shared collaboration content.

12. The medium of claim 8, wherein examining comprises examining a first video image to locate a first strip segment containing desired facial features of the second collaborator and examining a second video image to locate a second strip segment containing desired facial features of a third collaborator; and
   causing a display comprises, on the display device, causing a display of the first strip segment in a second frame and a display of the second strip segment in a third frame, the second and third frames being positioned beside one another and above a first frame for communicating shared collaboration content.

13. The medium of claim 12, wherein the method includes:
   with respect to a relative positioning of the second and third frames on the display device, spatially multiplexing a first audio signal corresponding to the second collaborator with second audio content corresponding to the third collaborator; and
   causing a broadcast of the spatially multiplexed first and second audio signals on a multichannel audio device positioned for the first collaborator.

14. The medium of claim 8, wherein the method includes examining the video image to locate a second segment positioned below the located strip segment; and wherein causing a display includes:
   superimposing the second segment with the shared content in the first frame; and
   emphasizing one of the second segment and the shared content over the other based on detected activity with respect to the first frame.

15. The medium of claim 8, wherein the method includes simulating motion parallax between the shared content and the desired facial features of the second collaborator in accordance with a detected shift in position of the first collaborator with respect to the display device.

16. A video collaboration system, comprising:
   an image engine configured to examine a video image to locate therein a strip segment containing desired facial features of a second collaborator, wherein the desired facial features include a gaze but not other facial features of the second collaborator; and
   a display engine configured to cause, on a display device positioned for a first collaborator, a display of the strip segment in a second frame positioned above a first frame for communicating shared collaboration content such that the other facial features are not displayed in the second frame.

17. The system of claim 16, wherein:

the image engine is operable to:
- size the strip segment according to a dimension of the facial features and a dimension of the second frame; and
- position the strip segment according to a relative orientation and position of the facial features within the video image; and the display engine is operable to mirror scale the strip segment to provide an appearance to the first collaborator that the second collaborator is positioned at a selected virtual distance behind the display device.

18. The system of claim 16, wherein:

the image engine is configured to examine a first video image to locate a first strip segment containing desired facial features of a second collaborator and to examine a second video image to locate a second strip segment containing desired facial features of a third collaborator;

the display engine is configured to cause, on the display device, a display of the first strip segment in a second frame and a display of the second strip segment in a third frame, the second and third frames being positioned beside one another and above a first frame for communicating shared collaboration content; and the system further comprises an audio engine configured to:
- with respect to a relative positioning of the second and third frames on the display device, spatially multiplex a first audio signal corresponding to the second collaborator with second audio content corresponding to the third collaborator; and
- cause a broadcast of the spatially multiplexed first and second audio signals on a multichannel audio device positioned for the first collaborator.

19. The system of claim 16, wherein the image engine is configured to examine the video image to locate a second segment positioned below the located strip segment, and the display engine is operable to:
- superimpose the second segment with the shared content in the first frame; and
- emphasize one of the second segment and the shared content over the other based on detected activity with respect to the first frame.

20. The system of claim 16, wherein the image engine is configured to:
- identify a vector defining a shift in position of the first collaborator with respect to the display device; and
- reposition the strip segment with respect to the video image in accordance with the identified vector to simulate motion parallax between the shared content and the desired facial features of the second collaborator.

* * * * *